United States Patent

[11] 3,571,487

[72] Inventor Alfred Tietze
     Munich, Germany
[21] Appl. No. 776,715
[22] Filed Nov. 18, 1968
[45] Patented Mar. 16, 1971
[73] Assignee Patent-Treuhand-Gesellschaft Fur
     Elektrische Gluhlampen MBH
[32] Priority Nov. 30, 1967
[33] Germany
[31] P 15 89 309.1

[54] VITREOUS SILICA-TO-METAL SEAL
     5 Claims, 5 Drawing Figs.
[52] U.S. Cl............................................ 174/50.61,
     313/184, 316/18
[51] Int. Cl............................................ H01j 5/32
[50] Field of Search............................................ 174/50.6,
     50.61, 50.63, 50.58, 152 (E), 152.4; 313/184,
     318; 287/189, 365

[56] References Cited
UNITED STATES PATENTS
2,504,522  8/1950  Greiner.................. 174/50.63
3,320,352  5/1967  Kershaw................. 174/50.63

*Primary Examiner*—Darrell L. Clay
*Attorney*—Howard P. King

ABSTRACT: A refractory metal hollow cap has a forward end of its interior frustoconical enlarging toward said end which is feather edged to foil thickness with the added assistance of inward tapering of the exterior surface of the cap in approach to said end, the interior hollow conical portion of the cap receives a correspondingly tapered end margin of a vitreous capillary tube; a rod extends from outside of the lamp axially through the refractory cap and the vitreous capillary tube, and where it passes through the stem or more solid end of the cap it is sealed thereto by fusion or welding; the conical end margin of the vitreous capillary tube substantially fills the conical hollow portion of the cap; the seal is completed by collapsing a juxtaposed area of a vitreous envelope in tight sealing engagement against the outside tapering surface of the cap thus including the feather edge within vitreous material both inside and outside with extensive sealing surface.

Patented March 16, 1971

ALFRED TIETZE
*INVENTOR.*

Patented March 16, 1971 3,571,487

VITREOUS SILICA-TO-METAL SEAL

In-lead wires rated for high current as required in high pressure discharge lamps, and elsewhere, say from 20 amperes up to several hundred amperes is well known to effect sealing of a relatively thick rod-shaped in-lead of tungsten by the aid of sealing glasses instead of using pinch seals with molybdenum foil as provided for lamps which are operated on lower amperages. One or a plurality of sealing glasses are utilized for this purpose having different coefficients of expansion which range between the coefficient of expansion of the vitreous silica of the arc tube, and the coefficient of expansion of the tungsten. Furthermore, seals have become known for which intermediary molybdenum foils are used whereat initially the tungsten rod is hermetically sealed to a cap of molybdenum and, subsequently, said cap terminating at its open end in a feather edge, is sealed to the vitreous silica by fusing the vitreous silica internally and externally around the edge of the cap. In the course of this, the opening of the cap may be turned in opposite direction to the interior of the lamp or may face the interior of the lamp.

Under prior art practice, in order to prevent adherence of the vitreous silica to the metal, except to the feather edge, provision is made of a plurality of intermediary foils of molybdenum between the metal and the vitreous silica. Thereby it is intended to avoid as consequence of variations in temperature the likelihood of the bond being rendered incomplete in places of larger metal cross section and the vitreous silica gets cracked. All said seals, however, have the great disadvantage that a relatively large dead space, i.e. a space which is separated from the arc tube but not hermetically sealed therefrom is unavoidable. Said space which extends between the vacuumtight duct and the place of rod support, can be exhausted only very slowly or not at all, resulting in a continuous rediffusion of the air from the dead space into the discharge space, or, of the gas from the discharge space into the dead space in the finished lamp.

The aforesaid and other disadvantages of known seals are avoided by the improved structure of the present invention. The vitreous silica-to-metal seal in accordance with the invention with a cap-shaped member of refractory metal, preferably molybdenum, terminating at its open end in a feather edge, for lead-in wires rated for high current intensities, preferably for lead-in wires used in high pressure electric discharge lamps, is characterized in that the convex surface of the cap, preferably of rolled molybdenum, hermetically sealed with its solid end section around a rod-shaped in-lead and facing with its open end the interior of the lamp, proceeds conically along both sides and is at its upper edge, preferably by grinding and etching, only of foil thickness, said cap being seated with its inner conical surface on an inserted capillary tube of vitreous silica the end section of which is conically shaped with substantially the same pitch ratio as the conical hollow of the cap. While brought very close, the end of said capillary tube does not touch the proximate end wall of the frustoconical hollow. The cap is girdled by the envelope or by a flare which ultimately becomes a part of the envelope. The flare is composed of vitreous silica and is collapsed against and unified with the tube immediately adjacent to the feather edge of the cap after heating to softening temperature sufficient for fusing purposes and productive of a very tight sealing to the outer concave surface of the cap with the seal substantially devoid of dead space.

DESCRIPTION

In general, the drawings show, by way of example, seals of metal-to-silica or other vitreous material, as employed in high current intensity lamps.

Figure 1A:
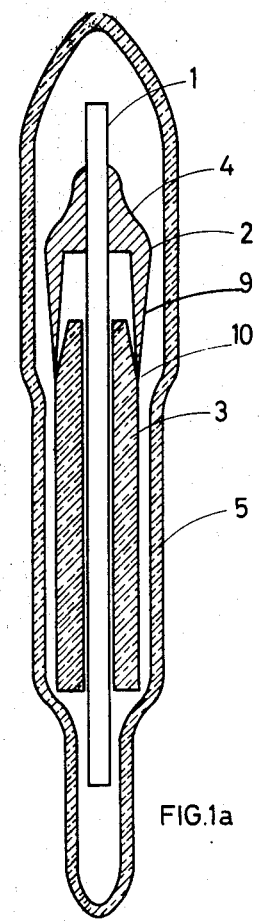
FIG. 1a is a longitudinal section through a vitreous silica-to-metal seal in process of fabrication with the capillary tube only partly inserted prior to fusion.

Giving attention in greater detail to the structure illustrated in the drawings, the reference numeral 1 designates a lamp in-lead, generally of tungsten, and which requires a vacuumtight seal at place of entry into the lamp envelope 14. A refractory hollow metal cap 2, preferably of molybdenum, having a stem section at its outer or rear end, is slipped into place and hermetically sealed to the tungsten rod 1. The forward section or end which ultimately is directed inwardly of the lamp, has a greater diameter of its hollow than the diameter of the rod, and that section of the hollow is frustoconical with greatest diameter of the hollow at the forward end of the cap. The outer surface of the forward section of the cap tapers progressively to slightly smaller size at its forward end, and by virtue of the inner conical shape and the outer taper of the cap a feather edge 10 of foil thickness is obtained thereat The angularity between the inner conical surface and outer taper is quite small, in the range perhaps of one degree or less. The maximum diameter of the conical hollow is approximately equal to the axial length or altitude of the conical section of the hollow. It has proven to be particularly advantageous to provide the altitude of the conical hollow at least as large as the diameter.

A vitreous capillary tube 3 of silica or the like, is slid onto the in-lead rod 1 toward the conical hollow of the cap. The outer end margin of the tube proximate to said hollow, is frustoconical substantially conforming to the frustoconical configuration of said hollow. The conical end of the tube is slipped into tight engagement within the conical hollow of the cap, having a slip depth of about 3 to 4 millimeters. The outer surface 4 of the cap rearwardly extending neck is provided with deformations such as grooves, indentations, notches, bevels or concavity in order to absorb or render tensile and torsion forces ineffective.

Figure 1B:
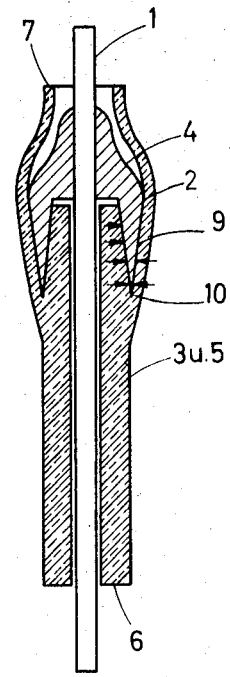
FIG. 1b is a similar view of the stem with the cap fused in place.

The entire assembly so far described and which may be referred to as the in-lead seal assembly or stem, is finally included within an envelope for its intended use. FIG. 1b shows the finished vitreous silica-to-metal seal. When heating the individual parts illustrated in FIG. 1a in vertical position until the metal parts begin to glow, the metal cap 2 has expanded so far that cap 2 and capillary tube 3 have been telescoped. During chilling, the cap firmly bears against the capillary tube of vitreous silica. In the course of this, an objectionable contact between the end face of the capillary tube and the forward flat wall of the cap is prevented due to the pitch of the conical surfaces of capillary tube 3 and cap 2. The tube 5 of vitreous silica softened upon heating is fused to the capillary tube 3 and caused to collapse onto the outer cap surface. In order to finish the stem, the vitreous silica tube is cut off at 6 and 7. The sealing zone extends in the places indicated by arrows, i.e. along the entire concave surface of the cap and on the upper outer cap edge. The length of the inner sealing zone is about 18 mm., the length of the outer zone from 5 to 7 mm.

Figure 2A:
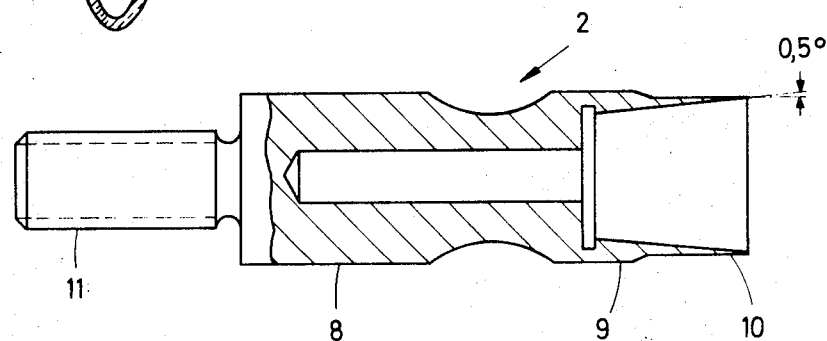
FIG. 2a shows another embodiment of cap.
Figures 2B, 2C:
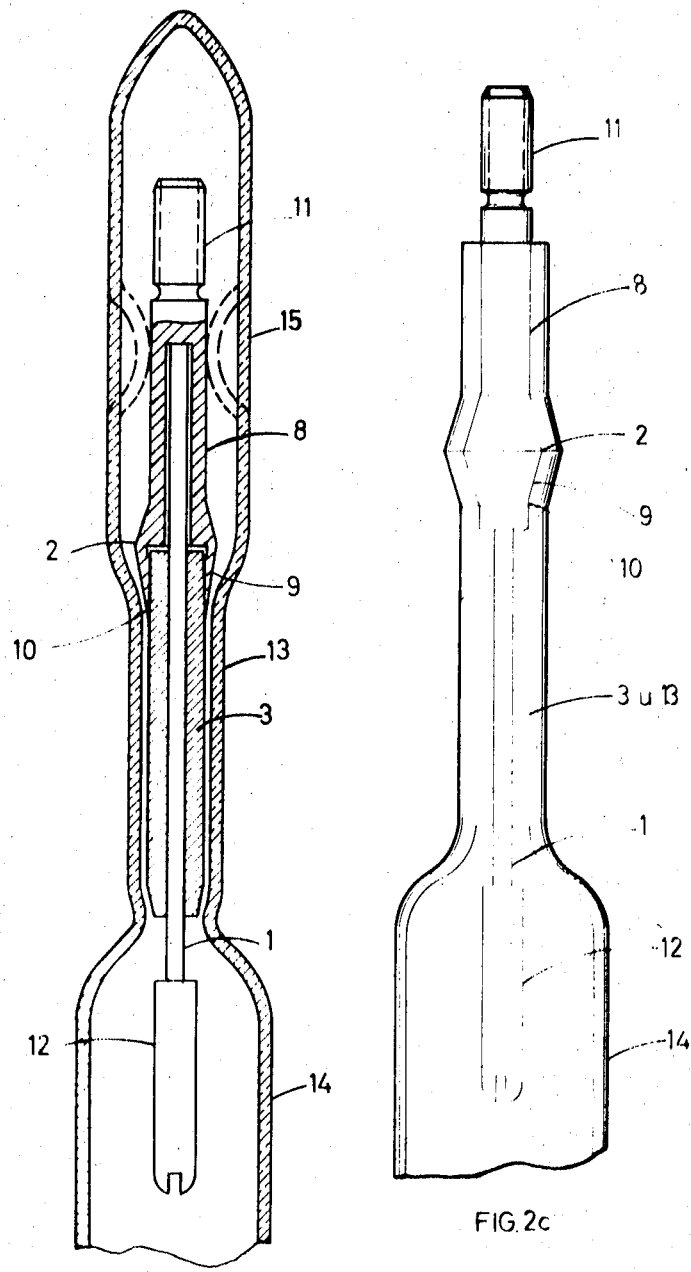
FIG. 2b shows the seal of FIG. 2a in process of inclusion in a lamp.
FIG. 2c is an elevational view of the seal assembled in place in a lamp.

As illustrated in FIGS. 2a through 2c, the cap 2 may also be worked from a preferably rolled solid molybdenum body having a length of about 30 to 100 mm. depending on the diameter of the cap and the type of terminal connection. The forward feather edge 10 of convex cap surface 9 with a length of about 10 mm. and outer and inner cone surfaces meeting under an angle of 0.5° is ground to from 8 to 10 microns and etched off. The cap hollow has a depth of about 20 mm. with a cap diameter of about 17 to 18 mm. The solid cap end section or neck 11 is provided with an external thread for direct connection of the supply cable.

As is shown in FIG. 2b, the rod-shaped in-lead 1 in inserted in the extended cap neck 8 from the open end of the cap, for example pressed in or screwed in, and is provided at its other end with the electrode 12. At 15, the sealing of the lamp stem inserted up to abutment of the beveled capillary end sections into envelope neck 13 of the discharge vessel 14 begins. FIG. 2c shows the finished seal. Eventually, a section of vitreous silica tubing can be slipped over the cap neck 8 prior to softening and collapsing on the envelope neck 13 so that the seal in this place proceeds uniformly in cylindrical configuration.

The vitreous silica-to-metal seal according to the invention is also suited for extremely high current loads such as 200 amps. and above. Manufacture of rod ducts by means of sealing glasses is very complex for rod diameters of 6 mm. and above which are required for such amperages. A further advantage relative to the formerly used seals is the fact that the lamp stem according to the invention in case of comparable current loads can be kept considerably shorter in length.

The specific construction and method of manufacture of the inventive caps permits reliable sealing of the vitreous silica to the metal without any intermediary foil. The omission of foil prevents that gas from the lamp gets under said foil and can exert injurious pressure in this place. Besides, the sealing zone of the inventive vitreous silica-to-metal seal is substantially enlarged due to the omission of the intermediary foil. Due to the fact that the cap according to the invention is substantially filled by the vitreous silica, the dead space in the seal is negligibly small.

The invention discloses a type of seal which, apart from the aforesaid advantages of high current capacitance, negligibly small dead space, and relatively short length, is mechanically pressure relieved and rugged. Due to the omission of junctions, all defects occurring at the junctions in case of high temperature are avoided. The possibility of direct screw, connection of the terminal to the cap or to the rod-shaped in-lead, i.e. without utilization of a base, prevents all accumulation of heat during operation of the lamp. The seal in accordance with the invention is likewise suited for automatic manufacturing methods.

I claim:

1. A vitreous silica-to-metal seal for in-lead wires rated for high current intensities and high pressure discharge lamps and the like, said seal comprising a cap-shaped refractory metal member having a rearwardly projecting neck and a forwardly open hollow bounded by a feather edge at its forward open end, a rod-shaped in-lead extending coaxially through said neck and out of the opening of said hollow and hermetically sealed in said neck, the bottom of the hollow proximate to said neck, terminating as a rear wall transverse to said in-lead rod, a capillary silica tube coaxially upon said in-lead and extending into said hollow substantially to but without contacting said transverse wall of the cap-shaped refractory metal member, said cap-shaped refractory metal member being fused from its feather edge as far as said wall to the section of said capillary tube included therein and along the outer feather edge.

2. A seal in accordance with claim 1, wherein said hollow is frustoconical and the included end section of the capillary tube is correspondingly frustoconical with substantially the same ratio of pitch.

3. A seal in accordance with claim 1, wherein the surfaces of the hollow end section including the capillary tube are both frustoconical and the altitude of the frustoconical hollow is at least as great as the diametrical dimension of the feather edge opening of the hollow.

4. A seal in accordance with claim 1, wherein the pitch of the conical surfaces of the hollow end section differ to an extent of approximately 0.5°.

5. A seal in accordance with claim 1, wherein said neck of the cap-shaped refractory metal member is externally screw threaded.